United States Patent
Dahringer et al.

(12) 
(10) Patent No.: US 6,235,663 B1
(45) Date of Patent: May 22, 2001

(54) FIBERS, FLAT TEXTILE STRUCTURES, AND METHODS

(75) Inventors: Jörg Dahringer, Bobingen; Axel Vischer, Königsbrunn, both of (DE)

(73) Assignee: Hoechst Trevira GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 09/210,299

(22) Filed: Dec. 11, 1998

(30) Foreign Application Priority Data

Dec. 11, 1997 (DE) ............................................. 197 55 047

(51) Int. Cl.$^7$ ....................................................... D04H 1/00
(52) U.S. Cl. ..................... 442/330; 442/333; 55/DIG. 39
(58) Field of Search ........................................ 55/DIG. 39

(56) References Cited

U.S. PATENT DOCUMENTS

| | | | |
|---|---|---|---|
| 4,818,599 | 4/1989 | Marcus | 428/288 |
| 5,726,107 | 3/1998 | Dahringer et al. | 442/414 |
| 5,871,845 | * 2/1999 | Dahringer et al. | 428/378 |

* cited by examiner

*Primary Examiner*—Terrel Morris
*Assistant Examiner*—Norca L. Torres
(74) *Attorney, Agent, or Firm*—Marshall, O'Toole, Gerstein, Murray & Borun

(57) ABSTRACT

Fibers, preferably electret fibers, made of materials which contain predominantly fiber-forming polymer or polycondensate, with a preparation applied onto the fibers, where the applied preparation contains at least one active substance which has volatilized after a time period of 20 minutes at a temperature of at most 250° C., preferably at most 230° C., to at least 80 weight % are disclosed. The active substance is preferably a compound having the general formula (I)

$$R_1R_2R_3NO \qquad (I)$$

where $R_1$ is hydrogen or an unsubstituted or substituted $C_1$–$C_{30}$ alkyl, alkenyl, or aryl group, and $R_2$ and $R_3$, independently of one another, are hydrogen or unsubstituted or substituted $C_1$–$C_{10}$ alkyl, alkenyl, or aryl groups.

41 Claims, No Drawings

FIBERS, FLAT TEXTILE STRUCTURES, AND METHODS

BACKGROUND OF THE INVENTION

1. Field of the Invention

The invention concerns fibers and flat textile structures such as mats, for example, made of fibers, which are coated with a preparation which has the property of decomposing during thermal treatment of the flat structure. Such decomposition may result in thermal strengthening, for example, so that flat structures with improved charge stability are obtained.

2. Description of Related Technology

Flat textile structures with an applied electrostatic charge are suitable, for example, for applications in filter technology because, in comparison to uncharged flat structures, they may have enhanced filtering action. Those flat structures which contain at least partly electret fibers are especially suitable for such flat structures. Electret fibers in the sense of the invention are fibers made of electrically non-conducting materials, which are able to store an applied electrostatic charge over a long time period (up to several years). Mats with increased charge stability are described in EP-A-0 705 931 (Apr. 10, 1996) and counterpart U.S. Pat. No. 5,726,107 (Mar. 10, 1998), the entire disclosures of which are incorporated herein by reference. According to these publications, charge stability can be improved by adding a charge control agent to the fiber-forming materials (polymers and polycondensates) in the electret fibers, and when different materials are used for the fiber-forming material. The mats of the prior art that can be used as filter material consist essentially of different types of fibers, but not all fibers present are necessarily electret fibers, that is, other fiber types may be present in certain amounts, depending on the desired profile of the properties.

If the fibers required to produce the filter are produced by the usual spinning methods then, during manufacture, they must be provided with an antistatic preparation because, otherwise, the frictional processes that occur during the production of fibers and especially during the production of flat textile structures lead to charging and thus to uncontrollable forces acting on the fibers. According to EP-A-0 705 931 and U.S. Pat. No. 5,726,107, a water-soluble antistatic preparation is applied onto the fibers during manufacture and is then washed out after the production of the mat. The electrostatic charging of the filter is done finally either by a special charging step, for example, a corona discharge, or quasi in situ during the operation of the filters via the triboelectric effect that occurs as a result of friction between the medium to be filtered and the filter material. The disadvantage of the method described is that the preparations mentioned above can be removed from the mat only by washing to a sufficient extent. If a washing process is carried out on an industrial scale, this may lead to irreversible mechanical damage of the mat, which would then have an adverse effect on its use as filter.

Other preparations for the production of staple fiber materials are described in EP-A-0 265 221 (Apr. 27, 1988) and counterpart U.S. Pat. No. 4,818,599 (Apr. 4, 1989). These preparations are vulcanized polysiloxanes or hydrophilic coatings containing polyalkylene oxide chains or segments, for example, a block copolymer of polyethylene oxide and polyethylene terephthalate chain members. These compounds are vulcanized at about 170° C. and after processing the fibers to flat structures, can no longer be removed by thermal treatment without damaging the fibers.

The preparations which are known in the art have the disadvantage that, after the formation of the flat textile structure, they can no longer be removed in a simple manner by thermal treatment without residues. Now it was found that the filter action can be improved and yet satisfactory properties are obtained during the fiber manufacture.

SUMMARY OF THE INVENTION

Accordingly, the invention provides fibers with a preparation applied thereon from which flat textile structures (e.g., non-woven fabrics) for filter materials, with improved filter action, can be produced in a simplified manner.

In one aspect, the invention concerns fibers, preferably electret fibers, made of materials which contain predominantly fiber-forming polymers (including polycondensates), with a preparation applied onto the fiber where the preparation contains at least one active substance, wherein at least 80 weight % of the active ingredients contained in the preparation is a compound having the general formula (I)

$$R_1R_2R_3NO \qquad (I)$$

where $R_1$ is hydrogen, or an unsubstituted or substituted $C_1$–$C_{30}$ alkyl, alkenyl, or aryl group and $R_2$ and $R_3$, independently of one another, are hydrogen or an unsubstituted or substituted $C_1$–$C_{10}$ alkyl, alkenyl, or aryl group.

The invention concerns fibers, preferably electret fibers, made of a material which contains predominantly a fiber-forming polymer or polycondensate, with a preparation applied onto the fiber, wherein after treatment of a temperature of 250° C. or less, preferably at 230° C. or less for a period of 20 minutes, at least 80 weight % of the applied preparation has volatilized.

DETAILED DESCRIPTION OF THE INVENTION

The term "fibers" is to be understood in its broadest conceivable meaning. These include preferably staple fibers, expediently with staple lengths of 0.2 to 200 mm, especially from 0.3 to 80 mm, but also endless fibers (filaments), bi- or multicomponent fibers, pulps, split fibers, and split film fibers.

"Electret fibers" are fibers which are able to store an applied electric charge over a long period of time. The electret fibers can also be multicomponent fibers but, as a rule, they are single-component fibers.

The materials contain fiber-forming polymers or polycondensates, which are preferably chosen from polyolefins, halogenated polyolefins, polyacrylates, polyacrylonitrile, polystyrene, and fluoropolymers, or from the group of polyesters, polycarbonates, aliphatic or aromatic polyamides, polyether ketones (for example, PEK and PEEK), polyarylene sulfides, especially polyphenylene sulfide, polyacetates and cellulose esters.

Preparations useful in the invention are generally solutions, emulsions, or mixtures which contain suitable active substances. Active substances are, for example, compounds according to formula (I) are suitable. Active substances are applied as antistatic agents or slip agents or for simplified production of the fibers or onto the flat textile structures produced from the fibers. In order to be able to remove the preparation thermally from the fibers, the active substance or active substances should contain at least 80 weight %, preferably at least 95 weight %, based on the applied preparation, of such active substances which volatilize after a period of 20 minutes at a temperature of 250°

C. or less, preferably at 230° C. or less. Preferably, the active substance consists of a compound according to formula (I).

Preferably, in addition to the active substance or substances, an aqueous solvent is also present. The concentration of the active substance in the solution can be changed during the manufacture of the fiber, so that the expert at the web line has a simple means of adjusting the weight content of active substance on the finished fiber. According to the invention, the weight content of the preparation applied onto the finished fiber is preferably 0.02 to 1 weight %, especially 0.05 to 0.4 weight %, based on the weight of the fiber-forming materials.

In the framework of the invention, preparation application is understood to mean the content of the preparation (without water or solvent) on the fiber, as determined by extraction. The liquid is the percentage loss of the preparation application as a result of the thermal treatment.

In the production of the fibers and of the flat structure, the preparation has an antistatic effect. However, for certain applications of the mats, for example, as an electret filter, the antistatic action is frequently undesirable. The preparation according to the invention makes it possible to remove the preparation from the fiber after the manufacture of the fiber or from a flat textile structure made from the fiber by heating the fibers to a suitable temperature for a limited amount of time.

In formula (I), the group $R_1$ is preferably an unsubstituted or substituted $C_8$–$C_{20}$ alkyl group or alkenyl group. Examples of suitable substituents are chlorine, bromine, iodine, and fluorine. Preferably, the $R_1$ groups are unsubstituted. Examples of unsubstituted $R_1$ groups are coconut fatty alkyl, stearyl, oleyl, lauryl, tallow fatty alkyl, octyl, and decyl. Among these groups, coconut fatty alkyl is especially preferred.

The groups $R_2$ and $R_3$, independently of one another, are unsubstituted or substituted $C_1$–$C_4$ alkyl groups or alkenyl groups, especially $C_1$–$C_4$ alkyl groups. Examples of suitable substituents are chlorine, bromine, iodine, and fluorine.

Examples of suitable $R_2$ and $R_3$ groups are aromatic groups, such as phenyl, toluyl and xylyl, aliphatic substituted groups, such as chloroethyl, chloropropyl, chloroallyl chloride, and chlorobutyl, as well as aliphatic unsubstituted groups, such as methyl, ethyl, isopropyl, propenyl, butyl, and butenyl. Preferably, methyl is used for groups $R_1$ and $R_2$.

Preferably, the $R_2$ and $R_3$ groups, independently of one another, are unsubstituted groups, especially both $R_2$ and $R_3$ are unsubstituted.

The active substance which should be volatilized, especially compounds of formula (I), decompose thermally at relatively low temperatures. The content of these substances on the thermally treated fiber is largely reduced to a weight content of preferably less than 1%, especially 0.01 to 0.05 weight %, based on the total weight. The antistatic action of the preparation is greatly reduced by thermal treatment. The temperature at which the thermal treatment can be performed lies preferably at 250° C. or less, especially at 230° C. or less, and preferably lies in a temperature range from 100 to 260° C., especially 100 to 200° C.

In order for thermal decomposition to occur in the suitable temperature range, the volatility of the preparation, defined as the percentage loss of the applied preparation, with respect to the applied preparation before temperature treatment, should be high. In any case, limits are set to the volatility so that during the actual manufacture of the fiber, the loss of preparation would not be too high at the processing temperatures. Therefore, the volatility must be adjusted to an optimal value. If the volatility is too low, the temperature at which the thermal treatment is performed would have to be increased to an unacceptably high value, which would lead to problems with regard to the processing temperatures of the fiber materials (for example, melting of the filling fibers).

The volatility of the applied preparation according to the foregoing definition is preferably at least 80% after a period of 20 minutes at a temperature of 250° C. or less. Preparations, the volatility of which is at least 80% after 20 minutes at 220° C. are especially suitable and those that show 95% are especially preferred.

The requirements regarding the volatility of the applied preparation according to the invention are usually not fulfilled by the preparations used in fiber manufacture. The volatility of the known preparations is usually below 50% after 20 minutes at 220° C.

An example of a suitable preparation is the commercially available compound Genaminox CS® (Clariant GmbH, formerly Hoechst AG), which is a coconut alkyl dimethylamine oxide in aqueous solution with an active ingredient content of approximately 30%. According to the data sheet of Hoechst AG (September 1987), this compound can be used as partial component in the production of filaments because of its antistatic properties.

The use of this preparation for the manufacture of staple fibers and as the only active ingredient component in the preparation is not suggested by the data sheet. Preferably, the preparation defined above does not contain any other active substances besides solvents. Therefore, expediently, during the preparation of the fibers according to the invention, no other preparation which is different from the preparation defined above is used (different preparations contain different or additional active ingredients). This would hinder the possibility of subsequent removal of the applied preparation by thermal treatment of the fibers, or of a flat structure produced from them. However, it is possible, without having an adverse effect on the subsequent thermal decomposition to have one of the volatile active substances, especially one different from those according to formula (I), present in a small amount (less than 20 weight %, preferably less than 10 weight %, based on the volatile active substances).

In the fiber-forming materials, in order to improve the electrostatic properties, expediently, organic or organometallic charge-control agents are contained. With the aid of these charge control agents, electret fibers with especially high charge stability can be obtained.

The organic or organometallic charge control agents that can be used are selected from the group of triphenylmethane, ammonium and immonium compounds, fluorinated ammonium and immonium compounds, biscationic acid amides, polymeric ammonium compounds, diallyl ammonium compounds, aryl sulfide derivatives, phenol derivatives, phosphonium compounds and fluorinated phosphonium compounds; Calix(n)arene; metal complex compounds, benzimidazolone or azine, thiazine or oxazine, which are listed in the color index as pigments, solvent dyes or acid dyes. Examples of suitable charge control agents are described in EP-A-0 705 931 (p. 9, line 34 to p. 16, line 40) and in U.S. Pat. No. 5,726,107 (col. 13, line 4 to col. 19, line 30).

The titer of the fiber is preferably below 3 dtex, especially below 2 dtex. The profile can also be multilobal, multiedged, star-shaped, band-shaped, or dumbbell-shaped. Preferably, the fibers have a circular profile.

The tear strength of the fiber lies preferably in a range from 20 cN/tex to 80 cN/tex, especially from 30 cN/tex to 65 cN/tex, the elongation at break is preferably between 10 and 200%, preferably 10 to 60%, highly preferably 20 to 50%, and the hot air shrinkage, measured at 200° C. dry ($S_{200}$) is preferably in the range from 0 to 50%, especially below 10%.

In another preferred embodiment, the fibers are multi-component fibers, preferably bicomponent fibers, especially of the core/mantle form. These fibers can be used with special advantage in the production of flat textile structures as thermally activatable bonding fibers where especially the mantle component melts at an elevated temperature.

Another objective of the invention is the provision of a flat textile structure containing melt-bondable fibers and, optionally, additional filing fibers, which is strengthened thermally at a temperature of at least 100° C. and, which is characterized by the fact that the active substance or compound according to formula (I) is present in an amount of at most 1 weight %, based on the total weight of the flat structure.

The term "flat textile structure" generally means flat structures which are essentially made of fibers. Examples of the flat textile structures according to the invention are nonwoven materials, such as mats or spunbonds, woven fabrics, scrim, air-laid fabrics, and knit fabrics.

The flat textile structures according to the invention are preferably mats. Mats can be produced especially advantageously as filter materials for fine dust. Especially preferably, the flat textile structures are carded fleeces.

The fibers contained in the flat textile structures can be staple fibers and endless fibers. Preferably, they are staple fibers. When the flat structures are strengthened thermally, preferably at a temperature from 100 to 200° C., at least some of the fibers are melt-bondable fibers. The thermal strengthening can be done according to the usual methods, for example, in an oven or on a heating calender. In addition to the thermally bondable fibers, other filling fibers may be present, which contain no melting or softening components, in contrast to the thermally bondable fibers. As mentioned above, the fibers may consist entirely or partially of materials which contain additional charge control agents, so that these are especially suitable as electret fibers. For certain technical applications, combinations of the types of fibers listed above may be of special interest.

Preferably, the flat textile structures contain filling fibers in an amount from 20 to 90 weight %, especially from 70 to 90 weight % and melt-bondable fibers (especially, bi-component fibers), in an amount from 80 to 10 weight %, especially from 30 to 10 weight %, based on the total weight of the flat structure. For the behavior of the flat textile structures, with regard to electrostatic charging, an amount of electret fibers of at least 10% is preferred.

Preferably, the filling fibers are essentially electret fibers, that is, the amount of electret fibers represents at least 80 weight % of the filling fibers. The melt-bonding fibers may also contain an electret material.

The amount of the active substance or compound according to formula (I) in the flat textile structure after the thermal treatment is preferably 0.01 to 0.05 weight %, based on the total weight of the flat structure.

The area weight of the flat textile structure can be adjusted within a wide range, depending on the desired properties. The preferred area weight is in the range from 5 to 500 g/m², especially 100 to 250 g/m².

In the flat structures according to the invention, an amount of at most 1 weight % of active substance or compound according to formula (I) is contained. Preferably, the amount is 0.01 to 0.05 weight %.

In order to obtain a maximum electrostatic effect, an amount of electret fibers from 75 to 100%, based on the total weight of the fibers contained in the flat structure, is especially preferred.

Furthermore, it may be expedient to produce flat textile structures from mixtures of two or more types of electret fibers, each type containing a different polar agent or different charge control agent.

According to the invention, the flat structures may be used as filters, especially as filters for fine dust.

Furthermore, the invention is concerned with a method for the production of a fiber, in which a fiber-forming polymer or polycondensate is spun and is further processed to a fiber and, in the manufacture of the fiber, a preparation which contains at least one active substance is applied onto the fiber, wherein at least 80 weight % of the active substances contained in the preparation volatilize after a period of 20 minutes at a temperature of 250° C. or less, preferably at 230° C. or less. Preferably, the active substance is a compound according to formula (I).

The manufacture of the fibers can be carried out, for example, in the known manner by spinning a fiber-forming material from the melt or from a solution in a suitable solvent, operating either with a wet-spinning or dry-spinning method, cooling the filaments as necessary, and drawing with a velocity of 1000 to 5000 m/min, followed by stretching and either depositing in a matting apparatus or cutting to staple fibers.

The application of the preparation can be carried out, for example, directly after spinning, directly before deposition or cutting, but also during an optional stretching step. It may be expedient to make the application at several points in order to counteract any loss of the preparation.

The foregoing method is carried out preferably in such a way that the fiber, onto which the preparation is applied, is processed optionally with other fibers, for example, to a flat textile structure and that this flat structure is then thermally treated at a temperature at which the amount of active substance or of the compound according to formula (I) is reduced by thermal decomposition. The thermal treatment can be carried out in a calender, but preferably it is carried out in an oven, especially in a hot-air oven. During the thermal treatment, the fibers on which the preparation is deposited are heated in the known manner to a temperature of, for example, 180° C., whereupon the active ingredient decomposes thermally as quickly as possible.

At the same time, during the thermal treatment, a mechanical strengthening or thermal bonding step may also be performed. However, it is also possible to first strengthen the flat structure, for example, by needling and then in another step to treat it thermally in order to volatilize the active substances. Preferably, the flat structure is not strengthened mechanically, but exclusively thermally.

The method of the invention makes it possible to produce filters which can be charged electrostatically, that is, the antistatic action which is damaging to the filter has largely disappeared during the preparation after the thermal treatment. Advantageously, in the production of flat textile structures, the preparation is not washed with water. Therefore, no problems occur with regard to disposal of the waste water that is produced during washing.

EXAMPLES

The following examples illustrate the practice of the invention.

Example 1a
Production of electret fibers prepared according to the invention (sample description D 21 65)

Polyethylene terephthalate fiber raw material was modified by mixing with charge control agent C.I. Solvent Blue 124 (described in EP-A-0 705 931, Formula 16) in the form of a masterbatch. The concentration of the charge control agent in the spinning material was 1.0 weight %. Then the material produced in that way was spun according to conventional spinning technology. The spinning temperature was 280° C. and the spinning speed was 1500 m/min.

As a preparation after spinning, before stretching and after stretching, the commercially available compound Genaminox CS® (Clariant GmbH, formerly Hoechst AG) was applied. Genaminox CS® has the following properties:

| | |
|---|---|
| Composition: | cocoalkyldimethylamine oxide in aqueous solution with a solid content of approximately 30% |
| Viscosity (dynamic): | <100 mPas at 20° C. (according to DIN 53015) |
| Thermal decomposition: | >100° C. |
| Denisty (° C.): | approximately 0.97 g/cm$^3$ (according to DIN 51757) |
| pH value: | 7 to 8 |
| Volatility (220° C. after 20 minutes) (defined as the amount of preparation volatilized in %, based on the total amount): | 96.8 weight % |

The preparation was diluted with water so that the resulting fibers had an alkyldimethylamine oxide content of 0.15 weight %.

The produced spun product was processed again according to conventional warp stretch technology (stuffer box crimping, fixing and cutting) to wool-like staple fibers prepared according to the invention, with a length of 38 mm with an individual titer of 1.3 dtex.

Example 1b
Production of bi-component fibers prepared according to the invention (D 2150)

Polyethylene terephthalate (melting point approximately 256° C.) and polyethylene terephthalate modified in the chain with 40 mole % of isophthalic acid (melting point approximately 110° C.) were spun according to the conventional bi-component spinning technology to a core-mantle fiber with low-melting mantle. The spinning temperature was 280° C. and the spinning speed was 1600 m/min. Corresponding to Example 1a, during spinning, the preparation Genaminox CS® was applied, so that the content of alkyldimethylamine oxide on the finished bi-component fiber was 0.31 weight %. The produced fibers had a staple fiber length of 50 mm and an individual titer of 2.2 dtex.

Example 1c
Production of unprepared electret fibers (D 2145)

Staple fibers were prepared on a laboratory scale according to Example 1a, but without the application of a preparation. The fibers with the sample designation D 21 45 had a titer of 1.3 dtex and a length of 38 mm.

Example 1d
Production of conventional prepared electret fibers (VKEL)

Staple fibers were produced according to Example 1a, which were treated with a preparation that is generally used in the art. The preparation was the usual anionic and nonionic surfactant solution, based on phosphoric acid esters and fatty acid polyethylene glycol esters and ethers. The amount on the finished fiber was 0.12 weight %.

Example 1e
Production of conventionally prepared bi-cofibers (VKBI)

PET/modified PET-bi-component fibers were produced according to Example 1b, except that during spinning, the conventional preparation according to Example 1d was used. This preparation was present on the finished bi-component fibers in an amount of 0.14 weight %. The obtained fibers had a staple fiber length of 50 mm and an individual titer of 2.2 dtex.

Example 2
Preparation of the mat

Using the staple fibers prepared according to Examples 1a–1e, a crimped mat with an basis weight of 200 g/m$^2$ was produced. Then the fiber was strengthened thermally in an oven at 200° C. with a residence time of 7.5 minutes.

| mat sample | mixture (weight ratio) | amount of preparation (weight %) |
|---|---|---|
| A | 80% D 2145/20% D 2150 | 0.03 |
| B | 80% D 2165/20% D 2150 | 0.04 |
| C | 80% VKEL/20% DKBI | 0.11 |

On the produced mats, the deposition performance was tested with a conventional filter test stand (MFP 2000), which operates according to the principle of measuring the scattered light. For this purpose, the mats were mounted in a carrier and placed in a test channel. The measuring dust was produced with an aerosol generator and was charged electrostatically with the aid of a rotating brush. On the outflow side, the spectrum of the particles was determined with a particle counter (PCS-2000). The following parameters were adjusted:

| | |
|---|---|
| Flow velocity: | 20 cm/s |
| Particle weight concentration: | 50 mg/m$^3$ |
| Air throughput: | 7.2 m$^3$/h |
| Test area: | 45 cm$^2$, dust application time: 1 minute |
| Type of dust: | "AC fine" (similar to SAE fine) with the following composition: |

| Particle size | Amount of particles [%] |
|---|---|
| 0.3–0.5 µm | 55.5 |
| 0.5–1.0 µm | 17.3 |
| 1.0–3.0 µm | 26.6 |
| 3.0–5.0 µm | 0.5 |
| >5.0 µm | not relevant |

The degree of separation obtained with the mat sample A (degree of deposition of filter effectiveness of a filter according to EP-A-0 705 931) with respect to a defined dust particle interval can be seen in the table below. In this table, T(X)=1 complete impermeability and T(X)=0, complete permeability of the filter to dust:

TABLE 1

Degree of separation T(X) of the mat sample A as a function of the particle size. The experiment was repeated 5 times. Pressure difference: 29 Pa at 7.2 m³/h: dust application: 1 min.

| particle size (μm) | degree of separation T(X) sample A, Experiments 1 to 5 | | | | |
|---|---|---|---|---|---|
| | 1 | 2 | 3 | 4 | 5 |
| 0.3 | 0.92 | 0.94 | 0.97 | 0.96 | 0.94 |
| 0.5 | 0.94 | 0.95 | 0.97 | 0.96 | 0.94 |
| 1.0 | 0.94 | 0.95 | 0.98 | 0.97 | 0.95 |
| 3.0 | 0.96 | 0.96 | 0.99 | 0.98 | 0.97 |
| 5.0 | 0.98 | 0.98 | 1.00 | 0.99 | 0.99 |

The degree of separation given in Table 1 remains constant, even after a dust application time of 10 minutes, within the limits of the resolution.

The deposition rates achieved with the mat sample C can be seen from the following table.

TABLE 2

(Comparison):
Degree of separation T(X) of mat sample C as a function of particle size. The experiment was repeated 5 times. Pressure difference: 28 Pa; dust application time: 1 min

| particle size (μm) | degree of separation T(X) sample C, Experiments 1 to 5 | | | | |
|---|---|---|---|---|---|
| | 1 | 2 | 3 | 4 | 5 |
| 0.3 | 0.70 | 0.68 | 0.71 | 0.69 | 0.68 |
| 0.5 | 0.79 | 0.77 | 0.80 | 0.77 | 0.79 |
| 1.0 | 0.86 | 0.85 | 0.86 | 0.85 | 0.85 |
| 3.0 | 0.96 | 0.97 | 0.97 | 0.95 | 0.96 |
| 5.0 | 0.99 | 0.99 | 0.99 | 0.99 | 0.99 |

The degrees of separation which are given in Table 2 also remained constant over a period of dust application of 10 minutes within the limits of the resolution.

The results in the table show that mats made of fibers in which the preparation Genaminox® was used during manufacture, can be produced with a very high degree of separation (separation performance). In contrast to the known methods, with the conventional preparation, the antistatic preparation can be removed thermally from the mat. Washing of the preparation with the related damage to the mat structure can be omitted.

As can be seen upon comparison of the degrees of separations in Table 1 and Table 2, the mats made from the fibers according to the invention have a higher filter action toward dust, especially in the range of fine dust, than in the case of mats which were produced from fibers which were prepared with the conventional preparation.

What is claimed is:

1. A textile structure comprising:
   electret fibers comprising a fiber-forming material selected from the group consisting of a fiber-forming polymer or a fiber-forming polycondensate,
   the fibers being coated with an initial amount of a preparation comprising at least one active substance, the active substance comprising a compound having the general formula (I)

$$R_1R_2R_3NO \qquad (I)$$

wherein $R_1$ is selected from the group consisting of hydrogen, an unsubstituted $C_1$–$C_{30}$ alkyl group, an unsubstituted $C_1$–$C_{30}$ alkenyl group, an unsubstituted $C_1$–$C_{30}$ aryl group, a substituted $C_1$–$C_{30}$ alkyl group, a substituted $C_1$–$C_{30}$ alkenyl group, and a substituted $C_1$–$C_{30}$ aryl group, and $R_2$ and $R_3$, independently of one another, are selected from the group consisting of hydrogen, an unsubstituted $C_1$–$C_{10}$ alkyl group, an unsubstituted $C_1$–$C_{10}$ alkenyl group, and an unsubstituted $C_1$–$C_{10}$ aryl group, a substituted $C_1$–$C_{10}$ alkyl group, a substituted $C_1$–$C_{10}$ alkenyl group, and a substituted $C_1$–$C_{10}$ aryl group,
   wherein at least 80 weight % of the initial amount of the preparation volatilizes and is removed from the fibers after exposure of the fibers with the initial amount of the preparation coated thereon to a temperature of 250° C. or less for a period of 20 minutes or less.

2. The textile structure of claim 1 wherein said temperature is 230° C. or less.

3. The textile structure of claim 1 wherein $R_1$ is selected from the group consisting of an unsubstituted $C_6$–$C_{20}$ alkyl group, an unsubstituted $C_6$–$C_{20}$ alkenyl group, a substituted $C_6$–$C_{20}$ alkyl group and a substituted $C_6$–$C_{20}$ alkenyl group and $R_2$ and $R_3$, independently of one another, are selected from the group consisting of an unsubstituted $C_1$–$C_4$ alkyl group, an unsubstituted $C_1$–$C_4$ alkenyl group, a substituted $C_1$–$C_4$ alkyl group and a substituted $C_1$–$C_4$ alkenyl group.

4. The textile structure of claim 1 wherein $R_2$ and $R_3$, independently of one another, are unsubstituted $C_1$–$C_4$ alkyl groups.

5. The textile structure of claim 4 wherein said $C_1$–$C_4$ alkyl group is a methyl group.

6. The textile structure of claim 1 wherein $R_1$ is an unsubstituted $C_1$–$C_{20}$ alkyl group.

7. The textile structure of claim 6 said $C_1$–$C_{20}$ alkyl group is a coconut fatty alkyl group.

8. The textile structure of claim 1 wherein the preparation further comprises 10 to 80 parts by weight of a compound having formula (I) and 90 to 20 parts by weight of an aqueous solvent.

9. The textile structure of claim 1 wherein the polymer or polycondensate is chosen from the group consisting of unhalogenated polyolefins, halogenated polyolefins, polyacrylates, polyacrylonitrile, polystyrene, fluoropolymers, polyesters, polycarbonates, aliphatic and aromatic polyamides, polyimides, polyether ketones, polyarylene sulfides, polyacetals, and cellulose esters.

10. The textile structure of claim 1 wherein the polymer or polycondensate is selected from the group consisting of PEK, PEEK, and polyphenylene sulfide.

11. The textile structure of claim 1 wherein the fiber is a prepared bi-component fiber or a multicomponent fiber.

12. The textile structure of claim 11 wherein the fiber is a core/mantle fiber.

13. The textile structure of claim 1 wherein the fiber is a prepared single-component fiber.

14. The textile structure of claim 1 wherein an amount of active substance remaining on the fibers after exposing the coated fibers to the temperature of 250° C. or less for at least 20 minutes ranges from 0.02 to 1 weight %, based on the weight of the fiber-forming material.

15. The textile structure of claim 14 wherein said amount of the active substance on the fibers ranges from 0.1 to 0.4 weight %.

16. The textile structure of claim 1 wherein the fiber-forming material further comprises organic or organometallic charge-control agents.

17. The textile structure of claim 1 wherein fiber-forming material further comprises melt-bondable fibers and filling fibers, and whereby the textile structure is strengthened thermally at a temperature of at least 100° C., and wherein an amount of active substance remaining on the fibers after exposing the coated fibers to the temperature of 250° C. or less for at least 20 minutes is less than 1 weight %, based on a total weight of the flat textile structure.

18. The textile structure of claim 17 wherein said amount of active substance ranges from 0.01 to 0.05 weight %, based on the total weight of the textile structure.

19. The textile structure of claim 17 wherein the textile structure is strengthened at a temperature ranging from 100° C. to 200° C.

20. The textile structure of claim 17 wherein said structure is a mat.

21. The textile structure of claim 17 wherein said structure is a carded mat.

22. The textile structure of claim 17 wherein the filling fibers are present in an amount ranging from 20 to 90 weight % and the bi-component fibers are present in an amount ranging from 80 to 10 weight % based on the total weight of the flat structure.

23. The textile structure of claim 1 wherein said structure is a filter.

24. The textile structure of claim 1 wherein said structure is a fine dust filter.

25. Electret fibers comprising:
a fiber-forming material selected from the group consisting of a fiber-forming polymer or a fiber-forming polycondensate,
the fibers being coated with an initial amount of a preparation comprising at least one active substance, the active substance comprising a compound having the general formula (I)

$$R_1R_2R_3NO \qquad (I)$$

wherein $R_1$ is selected from the group consisting of hydrogen, an unsubstituted $C_1-C_{30}$ alkyl group, an unsubstituted $C_1-C_{30}$ alkenyl group, an unsubstituted $C_1-C_{30}$ aryl group, a substituted $C_1-C_{30}$ alkyl group, a substituted $C_1-C_{30}$ alkenyl group, and a substituted $C_1-C_{30}$ aryl group, and $R_2$ and $R_3$, independently of one another, are selected from the group consisting of hydrogen, an unsubstituted $C_1-C_{10}$ alkyl group, an unsubstituted $C_1-C_{10}$ alkenyl group, and an unsubstituted $C_1-C_{10}$ aryl group, a substituted $C_1-C_{10}$ alkyl group, a substituted $C_1-C_{10}$ alkenyl group, and a substituted $C_1-C_{10}$ aryl group,
wherein at least 80 weight % of the initial amount of the preparation volatilizes and is removed from the fibers after exposure of the fibers with the initial amount of the preparation coated thereon to a temperature of 250° C. or less for a period of 20 minutes or less.

26. The fibers of claim 25 wherein said temperature is 230° C. or less.

27. The fibers of claim 25 wherein $R_1$ is selected from the group consisting of an unsubstituted $C_6-C_{20}$ alkyl group, an unsubstituted $C_6-C_{20}$ alkenyl group, a substituted $C_6-C_{20}$ alkyl group and a substituted $C_6-C_{20}$ alkenyl group and $R_2$ and $R_3$, independently of one another, are selected from the group consisting of an unsubstituted $C_1-C_4$ alkyl group, an unsubstituted $C_1-C_4$ alkenyl group, a substituted $C_1-C_4$ alkyl group and a substituted $C_1-C_4$ alkenyl group.

28. The fibers of claim 25 wherein $R_2$ and $R_3$, independently of one another, are unsubstituted $C_1-C_4$ alkyl groups.

29. The fibers of claim 28 wherein said $C_1-C_4$ alkyl group is a methyl group.

30. The fibers of claim 25 wherein $R_1$ is an unsubstituted $C_1-C_{20}$ alkyl group.

31. The fibers of claim 25 said $C_1-C_{20}$ alkyl group is a coconut fatty alkyl group.

32. The fibers of claim 25 wherein the preparation further comprises 10 to 80 parts by weight of a compound having formula (I) and 90 to 20 parts by weight of an aqueous solvent.

33. The fibers of claim 25 wherein the polymer or polycondensate is chosen from the group consisting of unhalogenated polyolefins, halogenated polyolefins, polyacrylates, polyacrylonitrile, polystyrene, fluoropolymers, polyesters, polycarbonates, aliphatic and aromatic polyamides, polyimides, polyether ketones, polyarylene sulfides, polyacetals, and cellulose esters.

34. The fibers of claim 25 wherein the polymer or polycondensate is selected from the group consisting of PEK, PEEK, and polyphenylene sulfide.

35. The fibers of claim 25 wherein the fibers are prepared bi-component fibers or multicomponent fibers.

36. The fibers of claim 35 wherein the fibers are core/mantle fibers.

37. The fibers of claim 25 wherein the fibers are prepared single-component fibers.

38. The fibers of claim 25 wherein an amount of active substance remaining on the fibers after exposing the coated fibers to the temperature of 250° C. or less for at least 20 minutes ranges from 0.02 to 1 weight %, based on the weight of the fiber-forming material.

39. The fibers of claim 38 wherein said amount of the active substance on the fibers ranges from 0.1 to 0.4 weight %.

40. The fibers of claim 25 wherein the fiber-forming material further comprises organic or organometallic charge-control agents.

41. The fibers of claim 25 wherein fiber-forming material further comprises melt-bondable fibers and filling fibers, and whereby the fibers are strengthened thermally at a temperature of at least 100° C., and wherein an amount of active substance remaining on the fibers after exposing the coated fibers to the temperature of 250° C. or less for at least 20 minutes is less than 1 weight %, based on a total weight of the fibers.

* * * * *